(12) United States Patent
Liao

(10) Patent No.: US 11,566,832 B2
(45) Date of Patent: Jan. 31, 2023

(54) ICE SHAVER

(71) Applicant: Ellen Li Liao, Los Angeles, CA (US)

(72) Inventor: Yu Li Liao, Los Angeles, CA (US)

(73) Assignee: Ellen Li Liao ( * ) Notice: Subject to any disclaimer, the term of this patent is extended or adjusted under 35 U.S.C. 154(b) by 183 days.

(21) Appl. No.: 17/159,165

(22) Filed: Jan. 27, 2021

(65) Prior Publication Data
US 2022/0235992 A1 Jul. 28, 2022

(51) Int. Cl.
F25C 5/12 (2006.01)
A23G 9/04 (2006.01)
A23G 9/22 (2006.01)
F25C 5/20 (2018.01)

(52) U.S. Cl.
CPC .............. F25C 5/12 (2013.01); A23G 9/045 (2013.01); A23G 9/22 (2013.01); A23G 9/224 (2013.01); F25C 5/20 (2018.01)

(58) Field of Classification Search
CPC ... F25C 5/12; F25C 5/20; A23G 9/045; A23G 9/22; A23G 9/224; A23G 9/28; A23G 9/30
See application file for complete search history.

(56) References Cited

U.S. PATENT DOCUMENTS

| | | | | | |
|---|---|---|---|---|---|
| 2,033,903 A | * | 3/1936 | Smith | ...................... | F25C 5/12 221/12 |
| 2,558,887 A | * | 7/1951 | Tesiero | .................. | A23G 9/287 222/61 |
| 3,217,940 A | * | 11/1965 | Fahn | ........................ | F25C 5/20 222/545 |
| 4,226,269 A | * | 10/1980 | Carr | .......................... | F25C 5/20 221/206 |
| 4,228,934 A | * | 10/1980 | Carr | .......................... | F25C 5/20 366/196 |
| 5,109,651 A | * | 5/1992 | Stuart | ..................... | B65B 5/067 62/344 |
| 5,918,767 A | * | 7/1999 | McGill | ................ | B67D 1/0001 222/105 |
| 6,009,718 A | * | 1/2000 | Ikari | ........................ | F25C 5/20 251/129.2 |
| 6,012,660 A | * | 1/2000 | Colman | .................... | F25C 5/12 241/37.5 |
| 9,568,233 B2 | * | 2/2017 | Liao | .......................... | F25C 5/02 |
| 10,443,917 B2 | * | 10/2019 | Kim | .......................... | F25C 5/12 |

* cited by examiner

Primary Examiner — Christopher R Zerphey
(74) Attorney, Agent, or Firm — Bruce Stone LLP; Joseph A. Bruce

(57) ABSTRACT

Disclosed is an ice shaver including a refrigerator, a moving mechanism, a driving device, a knife assembly and a pushing member. The refrigerator includes a bearer including an ice dropping channel and a door assembly, and the knife assembly is located between the pushing member and the door assembly. The driving device drives the moving mechanism so that the moving mechanism drives the door assembly to selectively move between an unsealing position and a sealing position. When the door assembly is located at the unsealing position, the door assembly unseals the ice-dropping channel. When the door assembly is located at the sealing position, the door assembly seals the ice-dropping channel. Therefore, it is possible to protect an ice cube in the refrigerator from being contaminated by the external environment.

15 Claims, 10 Drawing Sheets

ICE SHAVER

BACKGROUND

Field of the Invention

The present invention relates to an ice shaver, and more particularly to an ice shaver with a refrigerator with a sealable ice dropping channel.

Related Prior Art

At present, most of the ice shavers on the market use the method of exposing the ice cubes to the outside air for users to shave ice. However, ice cubes exposed to the outside air are not only easy to melt, and even if the ice cubes are made of pure water, they are also susceptible to contamination by bacteria or viruses scattered in the air. As a result, the shaved crushed ice also contains bacteria or viruses, leading to affecting the health of consumers.

SUMMARY

One objective of the present invention is to provide an ice shaver with a refrigerator with a sealable ice dropping channel.

To achieve the above objective, an ice shaver according to an embodiment of the invention comprises:

a refrigerator including a first opening, a first door assembly, and a bearer, the first door assembly being used to selectively seal and unseal the first opening, the bearer including an ice dropping channel and a second door assembly;

a moving mechanism connected to the second door assembly;

a driving device configured to drive the moving mechanism so that the moving mechanism drives the second door assembly to selectively move between an unsealing position and a sealing position;

a knife assembly arranged in the refrigerator and located near the ice dropping channel; and a pushing member arranged in the refrigerator to push an ice cube against the knife assembly so that the knife assembly is able to shave or cut the ice cube to produce crushed ice, and the knife assembly being located between the pushing member and the second door assembly;

when the second door assembly is in the unsealing position, the second door assembly unseals the ice dropping channel so that the crushed ice falls through the ice dropping channel, and when the second door assembly is in the sealing position, the second door assembly seals the ice dropping channel.

In another embodiment, the ice dropping channel includes a second opening and a third opening opposite to the second opening, the second door assembly includes a first plate, when the second door assembly is in the sealing position, the first plate seals the second opening, and when the second door assembly is in the unsealing position, the first plate unseals the second opening.

In yet another embodiment, the second door assembly includes a second plate, when the second door assembly is in the sealing position, the second plate seals the third opening, and when the second door assembly is in the unsealing position, the second plate unseals the third opening.

In yet another embodiment, the second door assembly includes a spring and a rotary shaft, the spring includes a first end and a second end opposite to the first end, the first end of the spring abuts against the first plate, the second end of the spring abuts against the second plate, and the first plate is pivotally connected to the second plate through the rotary shaft.

In yet another embodiment, the first plate and the second plate are unparallel when the second door assembly unseals the ice dropping channel.

In yet another embodiment, the moving mechanism includes a rotating shaft and at least one arm, the arm includes a first end and a second end opposite to the first end, the first end of the arm is connected to the rotating shaft, the second end of the arm is pivotally connected to the second door assembly, when the driving device drives the rotating shaft to rotate in a first direction, the second door assembly moves toward the unsealing position to unseal the ice dropping channel, and when the driving device drives the rotating shaft to rotate in a second direction opposite to the first direction, the second door assembly moves toward the sealing position to seal the ice dropping channel.

In yet another embodiment, the bearer further includes a sliding groove disposed in the ice dropping channel, the second door assembly further includes a positioning structure slidably disposed in the sliding groove, the sliding groove includes a first end and a second end opposite to the first end, when the second door assembly is in the sealing position, the positioning structure is located at the first end of the sliding groove, and when the second door assembly is in the unsealing position, the positioning structure is located at the second end of the sliding groove.

In yet another embodiment, the driving device is a manual control member. Or, the driving device is a manual control member.

In this way, the ice shaver provided by the present invention can not only prevent the carried ice cubes from melting rapidly due to the influence of room temperature, but also protect the carried ice cubes from be contaminated by bacteria or viruses contained in the outside air.

The above description of the content of the disclosure and the description of the following embodiments are used to demonstrate and explain the spirit and principle of the present invention, and provide a further explanation of the scope of the claims.

DETAILED DESCRIPTION

Figure 1:
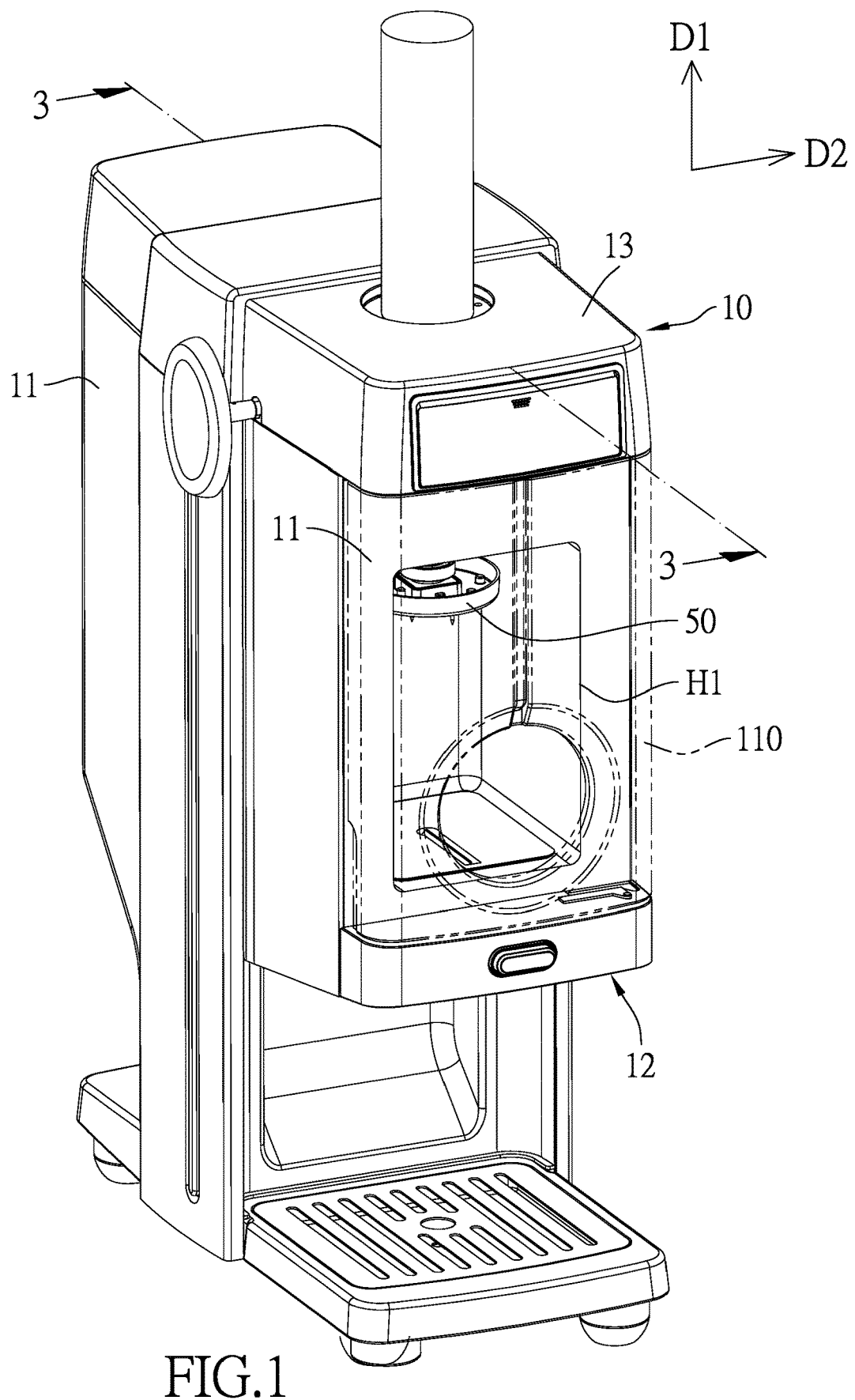
FIG. 1 is a perspective view of a part of an ice shaver according to an embodiment of the present invention, to show that the first door assembly of the refrigerator seals the first opening of the refrigerator, and show the inside of the refrigerator after removing the loading member of ice cubes.
Figure 2:
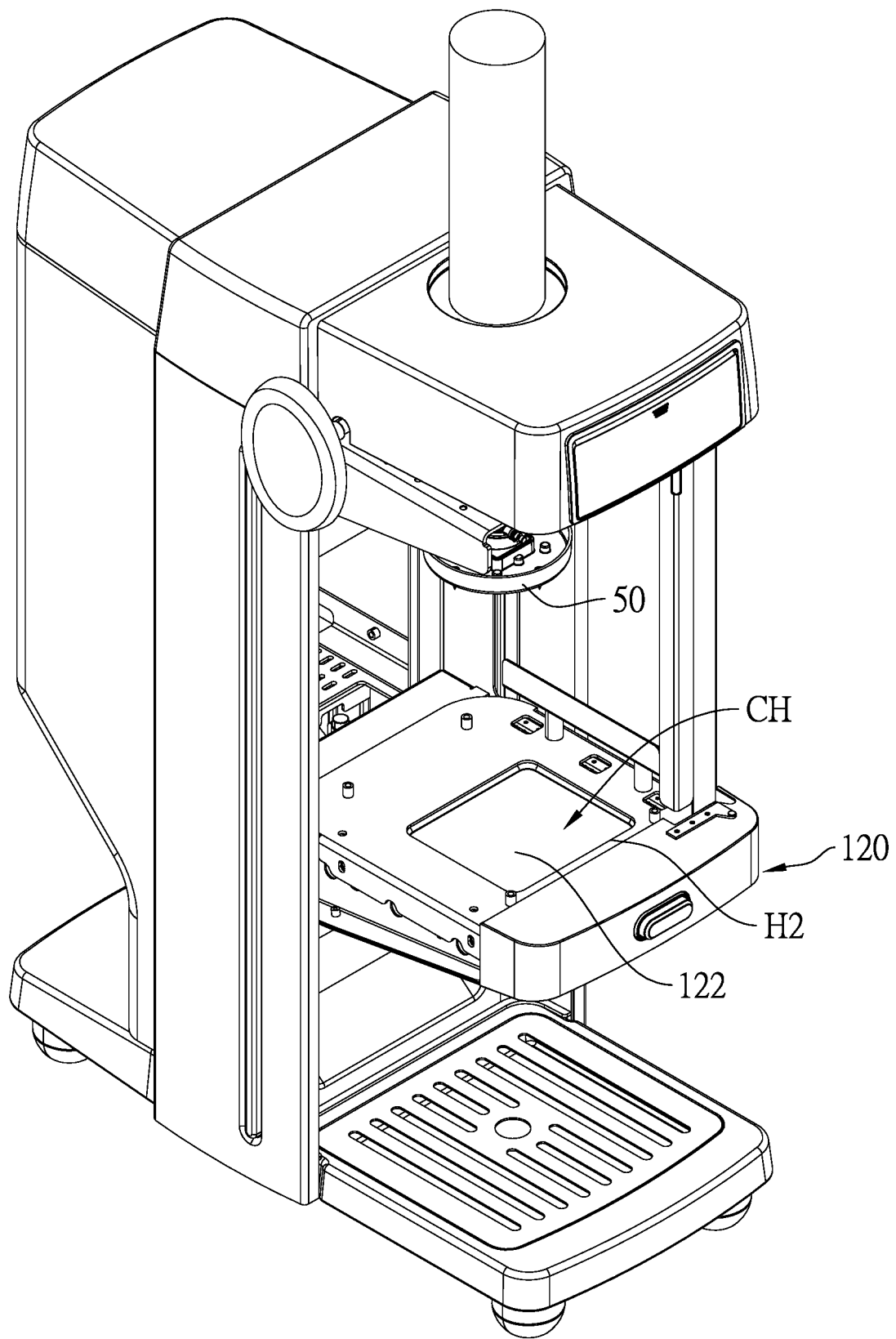
FIG. 2 is a perspective view of a part of the ice shaver according to an embodiment of the present invention after removing part of the housing, part of the first door assembly and the knife assembly.
Figure 3:
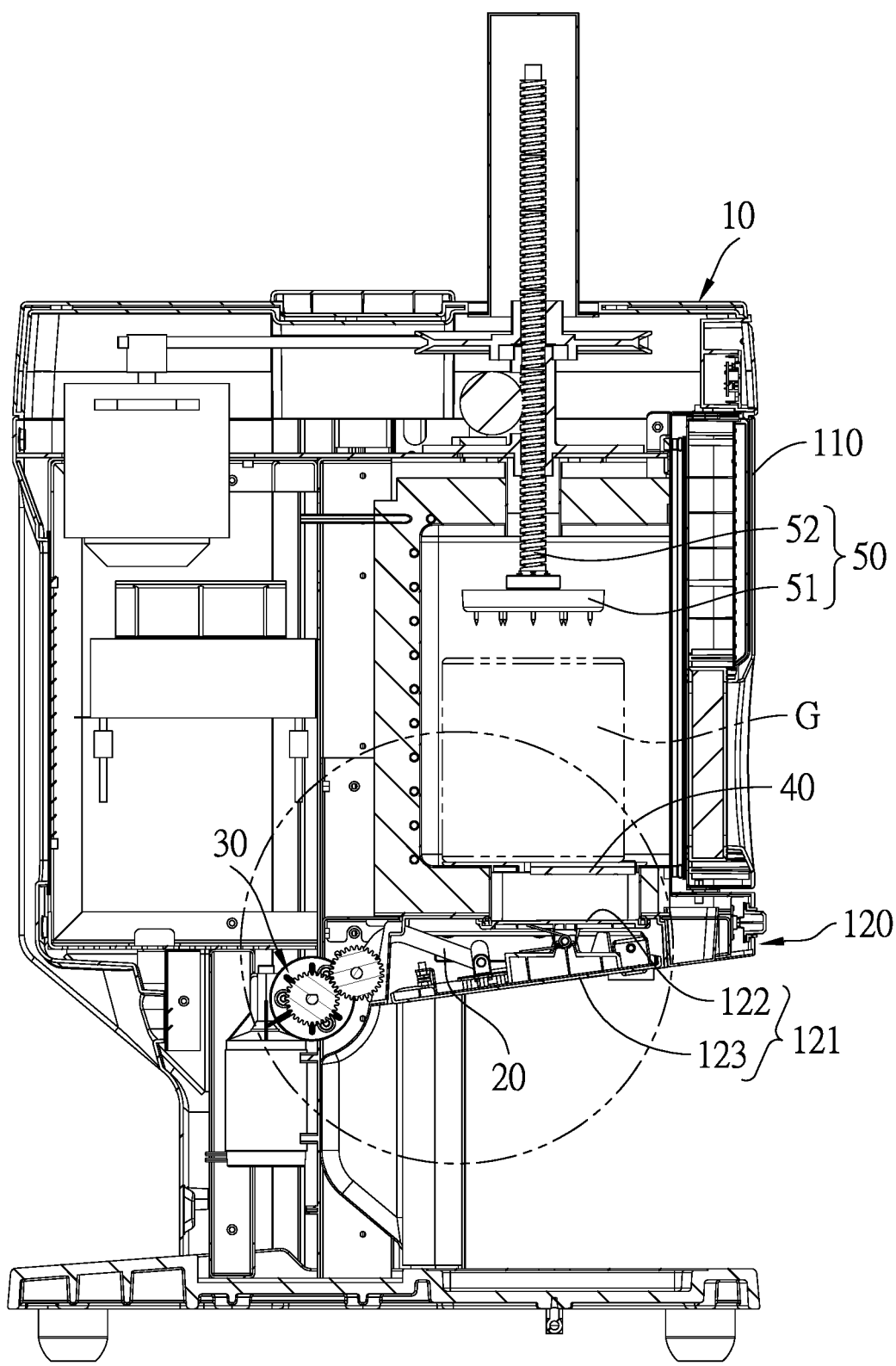
FIG. 3 is a cross-sectional view of the ice shaver according to an embodiment of the present invention taken along the line 3-3 of FIG. 1.
Figure 4:
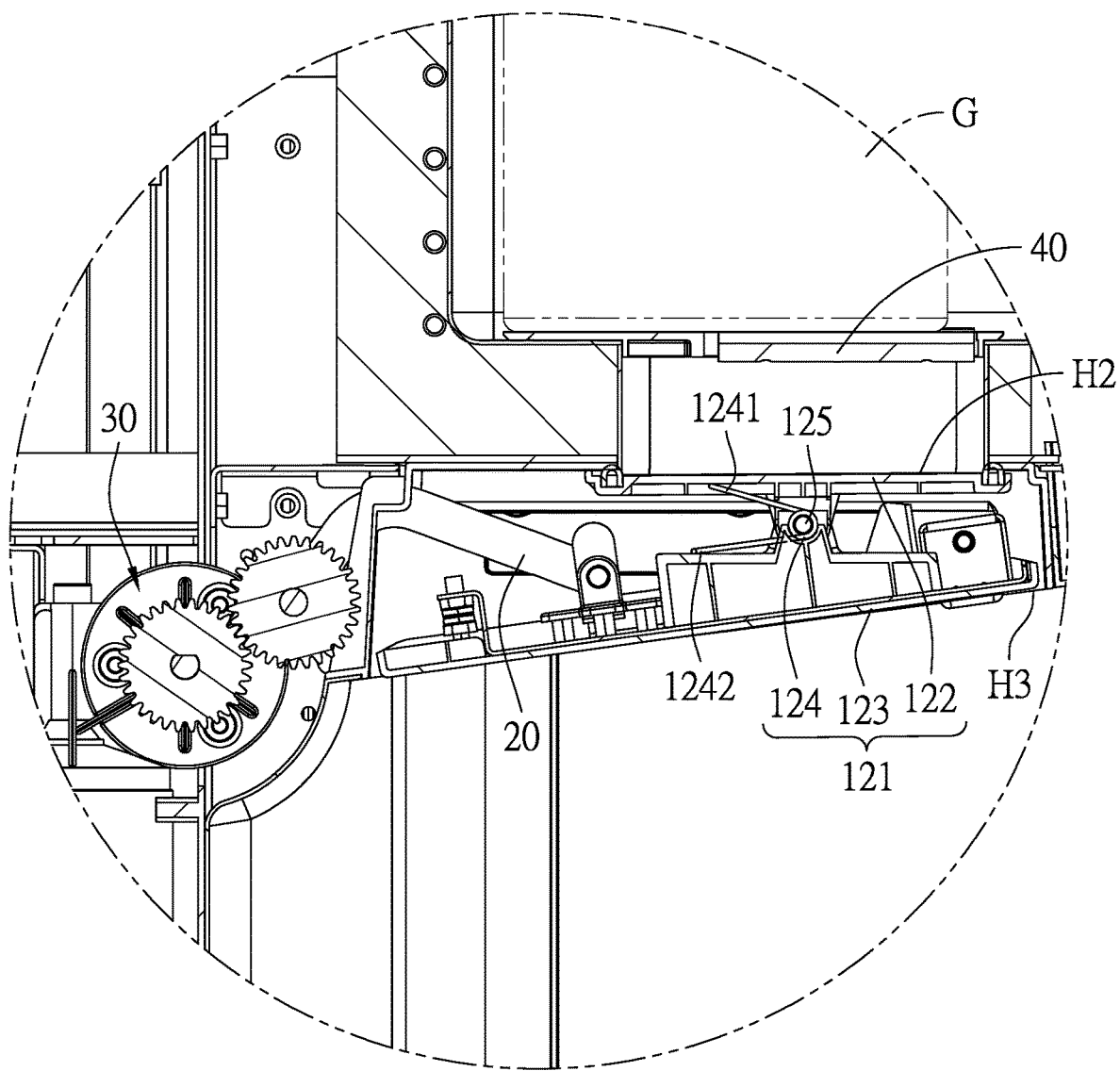
FIG. 4 is a magnified view of a part of the ice shaver in FIG. 3 drawn according to an embodiment of the present invention.
Figure 5:
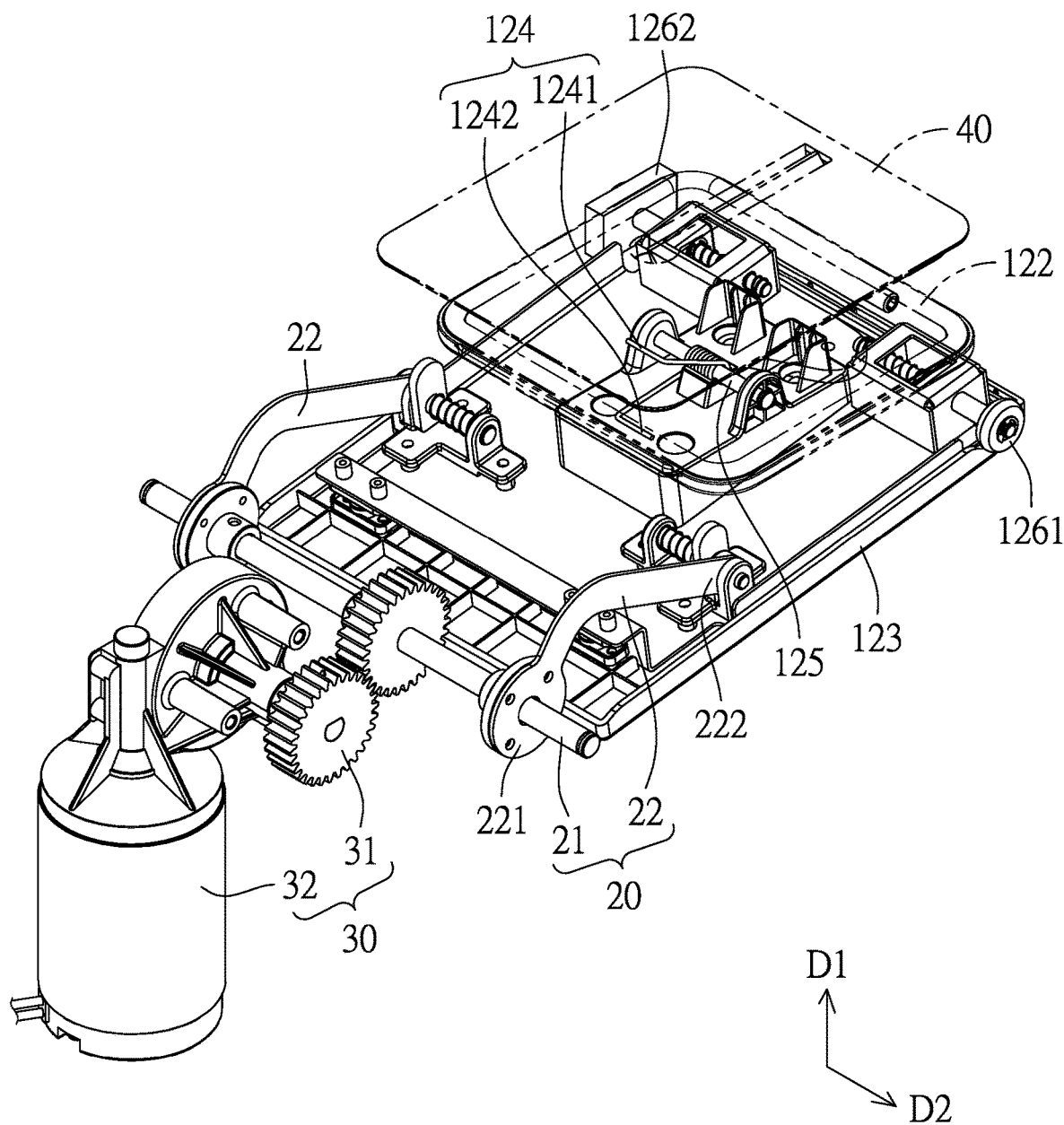
FIG. 5 is a schematic diagram of a part of an ice shaver drawn according to an embodiment of the present invention, to present the configuration relationship among the knife assembly, the second door assembly, the moving mechanism and the driving device when the second door assembly is in the sealing position.

The detailed features and advantages of the present invention will be described in detail in the following embodiments, and the content is sufficient to enable anyone familiar with the relevant art to understand the technical content of the present invention and implement it accordingly, and according to the content disclosed in the specification, the drawings and the claims, anyone familiar with the relevant art can easily understand the objective and advantages of the present invention. The following examples further illustrate the viewpoint of the present invention in detail, but do not limit the scope of the present invention by any viewpoint.

Referring to FIGS. 1-4, an ice shaver according to an embodiment of the present invention includes a refrigerator 10, a moving mechanism 20, a driving device 30, a knife assembly 40, and a pushing member 50. The refrigerator 10 includes four side shells 11, a bottom shell 12 and a top shell 13. The four side shells 11 surround the bottom shell 12 and the top shell 13 to form an accommodating space.

The refrigerator 10 further includes a first opening H1, a first door assembly 110, and a bearer 120. The first opening H1 is formed by penetrating one of the side shells 11. The first door assembly 110 is disposed to the first opening H1, so that the first door assembly 110 can be operated by a user to selectively seal and unseal the first opening H1. When the first door assembly 110 unseals the first opening H1, the user can put ice cubes into or take out ice cubes from the accommodating space of the refrigerator 10.

The bearer 120 is disposed to the bottom shell 12, and a part of the bottom shell 12 can be used as part of the outer surface of the bearer 120. The bearer 120 includes an ice dropping channel CH and a second door assembly 121. The ice dropping channel CH penetrates the bearer 120 and includes a second opening H2 and a third opening H3 opposite to the second opening H2. The moving mechanism 20 is connected to the second door assembly 121. The driving device 30 drives the moving mechanism 20 so that the moving mechanism 20 drives the second door assembly 121 to selectively move between an unsealing position and a sealing position. When the second door assembly 121 is in the unsealing position, the second door assembly 121 can open the ice dropping channel CH. When the second door assembly 121 is in the sealing position, the second door assembly 121 can seal the ice dropping channel CH.

The knife assembly 40 may be arranged in the accommodating space of the refrigerator 10 and located near the ice dropping channel CH. The pushing member 50 may also be arranged in the accommodating space of the refrigerator 10. The pushing member 50 includes a pushing plate 51 and a driver 52 connected to the pushing plate 51 and configured to drive the pushing plate to move toward and push the ice cube. The knife assembly 40 is located between the pushing member 50 and the second door assembly 121, and the knife assembly 40, the pushing member 50 and the second door assembly 121 may be arranged, for example, along a first axis D1. Therefore, in use, the driver 52 of the pushing member 50 can drive the pushing plate 51 to move toward and push the ice cube G so that the ice cube G presses against the knife assembly 40 whereby the knife assembly 40 can shave or cut the ice cube G to produce crushed ice.

Figure 6:
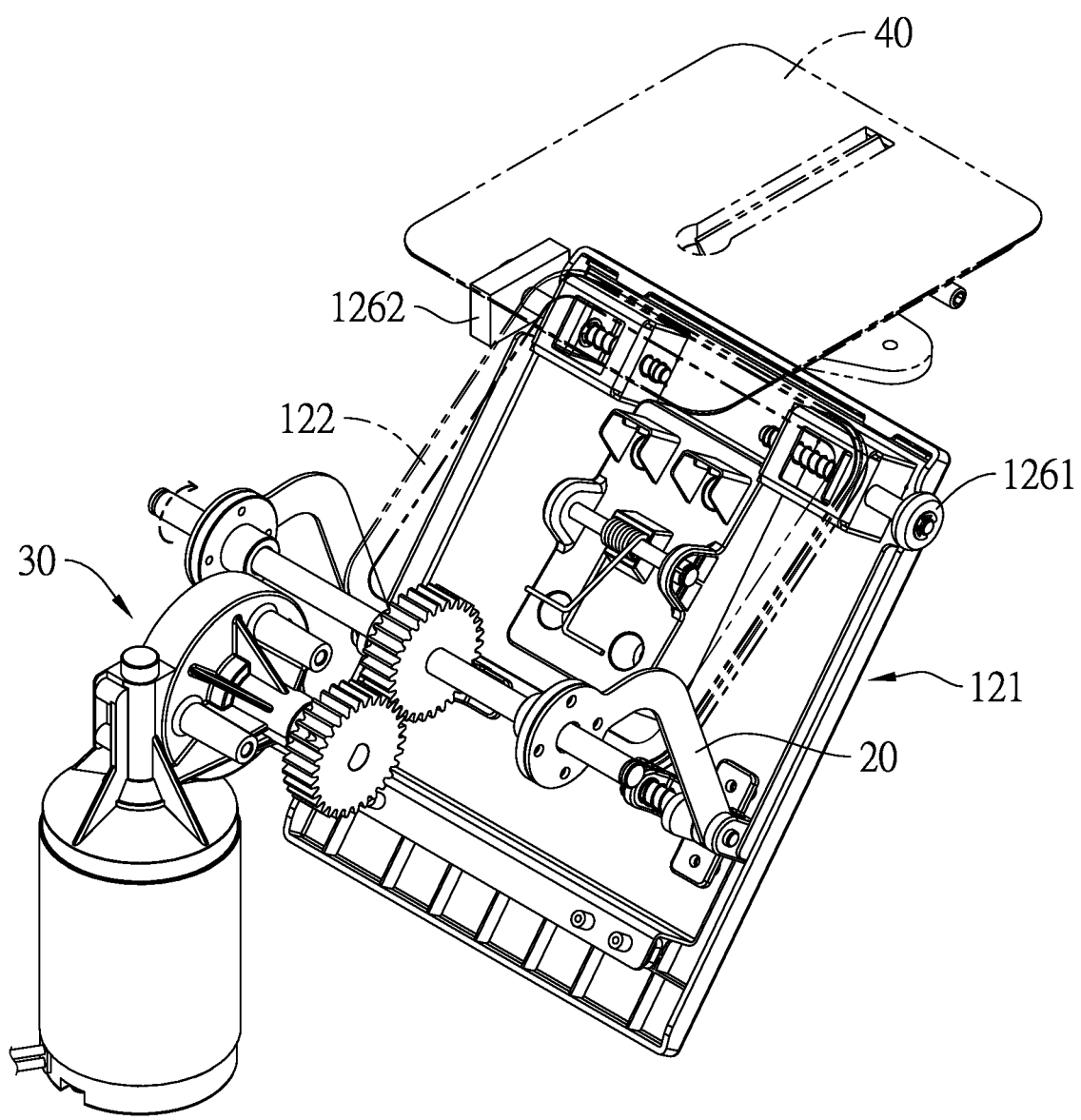
FIG. 6 is a schematic diagram of a part of an ice shaver drawn according to an embodiment of the present invention, to present the configuration relationship among the knife assembly, the second door assembly, the moving mechanism and the driving device when the second door assembly is unsealing the ice dropping channel.

Please refer to FIGS. 4 to 8, the moving mechanism 20 may, for example, include a rotating shaft 21 and at least one arm 22. Taking the embodiment shown in FIG. 5 as an example, the rotating shaft 21 can be arranged along a second axis D2 perpendicular to the first axis D1, and the moving mechanism 20 includes two arms 22. Each arm 22 includes a first end 221 and a second end 222 opposite to the first end 221. The two arms 22 are respectively located at opposite ends of the rotating shaft 21. The first end 221 of each of the arms 22 is connected to the rotating shaft 21, and the second end 222 of each of the arms 22 is pivotally connected to the second door assembly 121. The driving device 30 may, for example, include a gear set 31 and a motor 32. The gear set 31 is connected to the rotating shaft 21, and the motor 32 drives one or more gears of the gear set 31 to rotate, thereby driving the rotating shaft 21 to rotate. When the motor 32 drives the rotating shaft 21 through the gear set 31 to rotate in a first direction, the second door assembly 121 moves toward the unsealing position to unseal the ice dropping channel CH, as shown in FIG. 6. When the motor 32 drives the rotating shaft 21 through the gear set 31 to rotate in a second direction opposite to the first direction, the second door assembly 121 moves toward the sealing position to seal the ice dropping channel CH.

Figure 7:
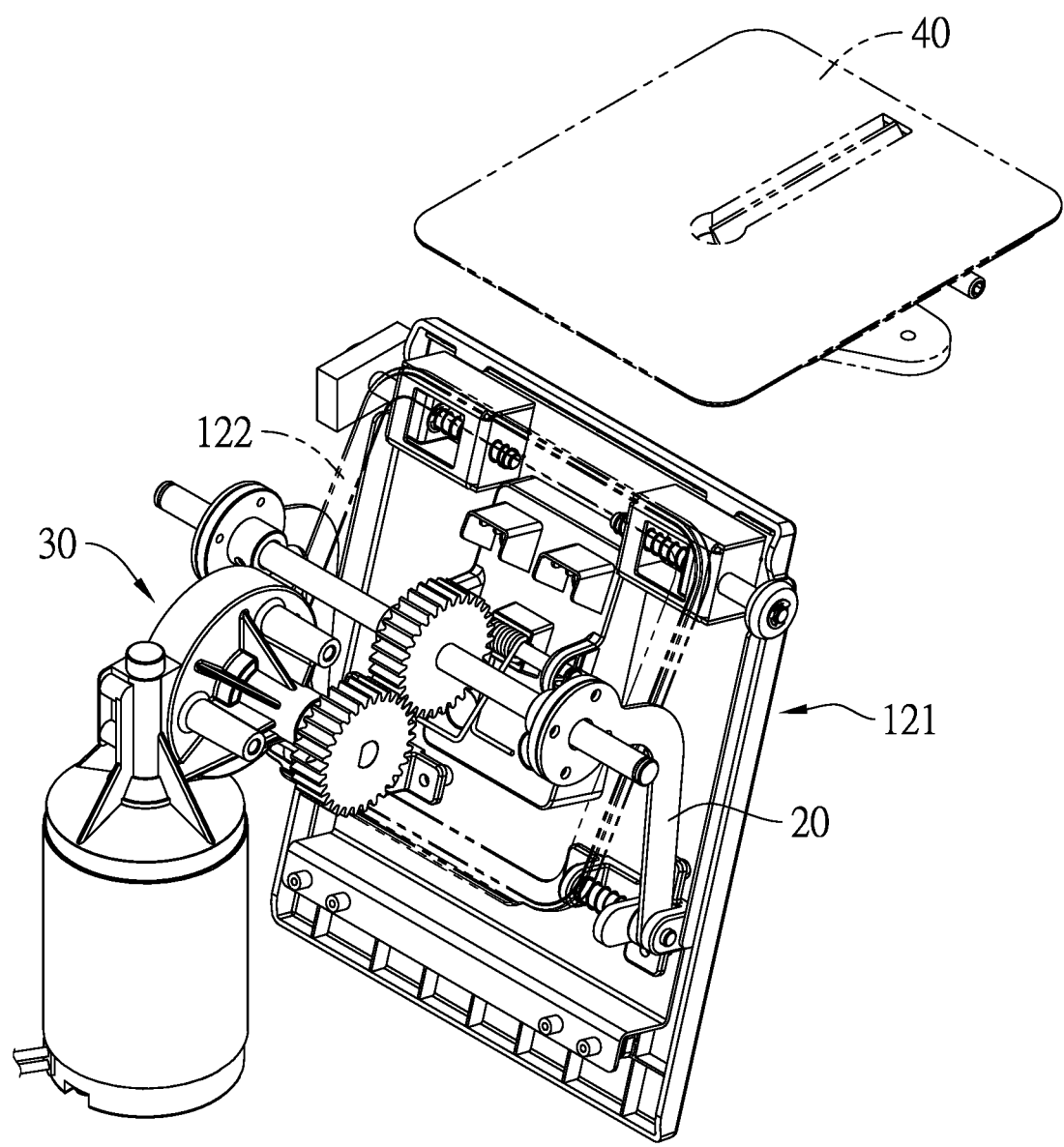
FIG. 7 is a schematic diagram of a part of an ice shaver drawn according to an embodiment of the present invention, used to present the configuration relationship among the knife assembly, the second door assembly, the moving mechanism and the driving device when the second door assembly is in the unsealing position.
Figure 8:
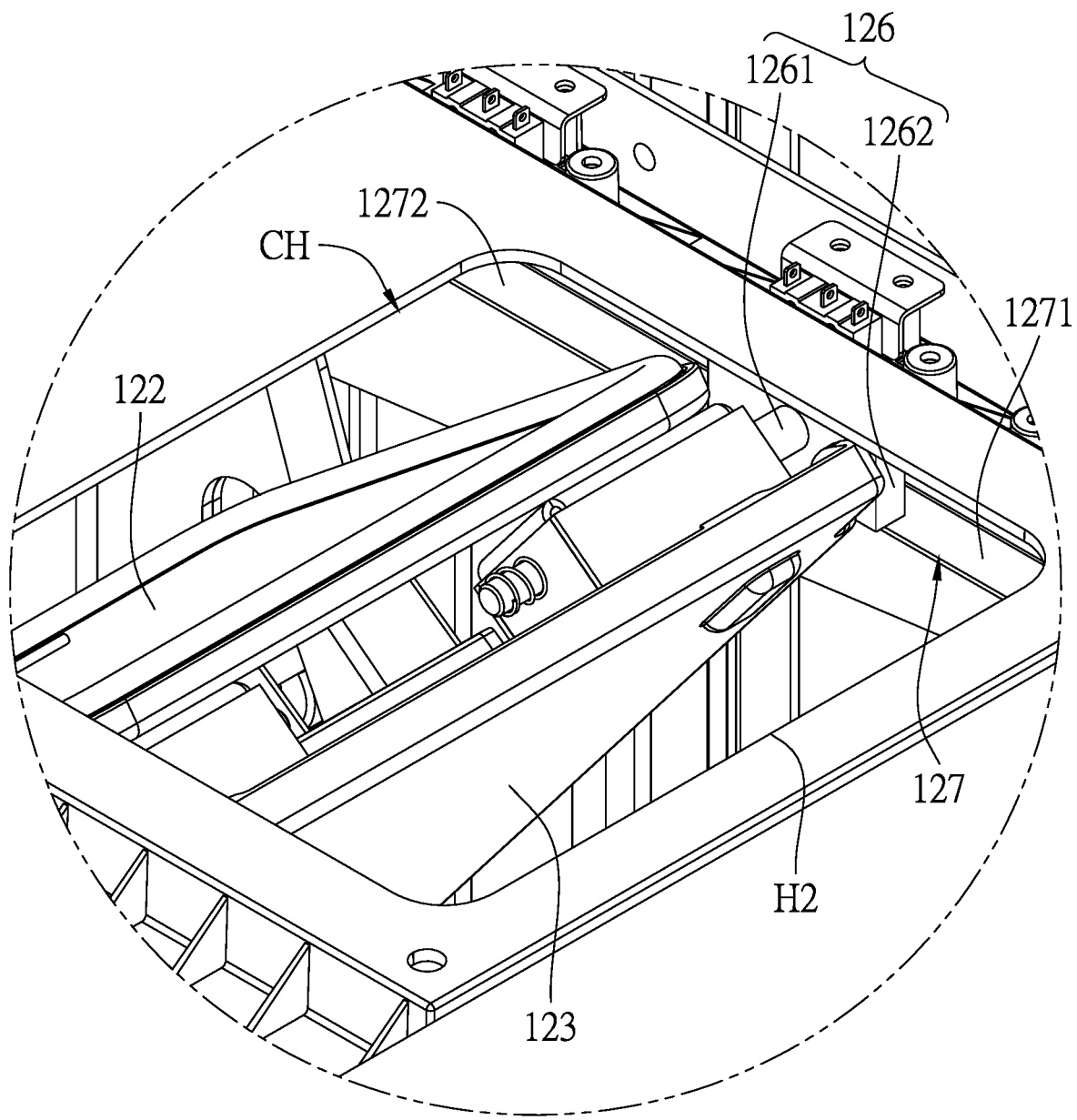
FIG. 8 is a schematic diagram of a part of the ice shaver drawn according to an embodiment of the present invention, which is used to present a state where part of the second door assembly moves along the sliding rail of the bearer.
Figure 9:
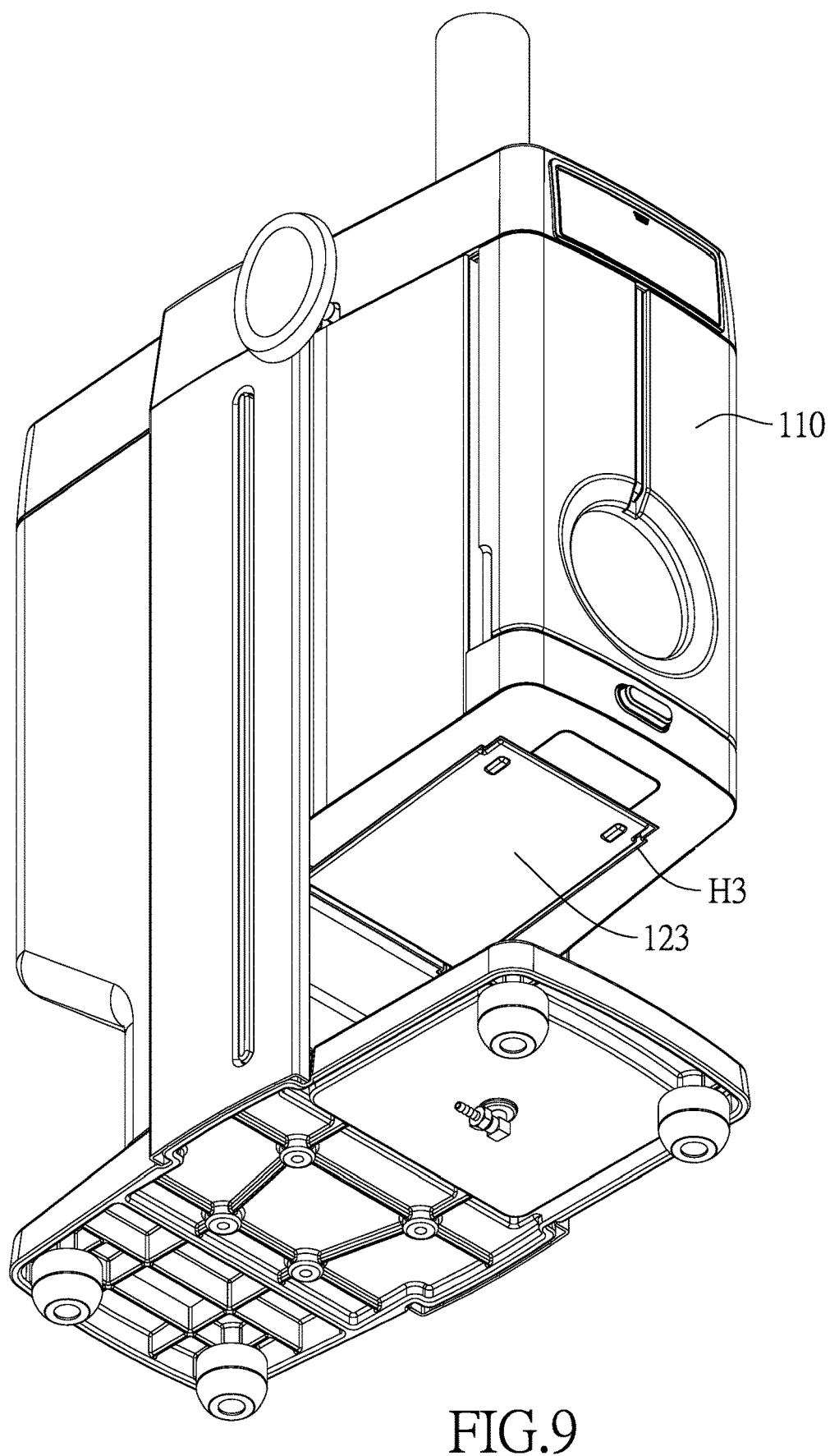
FIG. 9 is a schematic diagram of the appearance of a part of the ice shaver drawn according to an embodiment of the present invention, to show the state when the second plate seals the third opening of the ice dropping channel.
Figure 10:
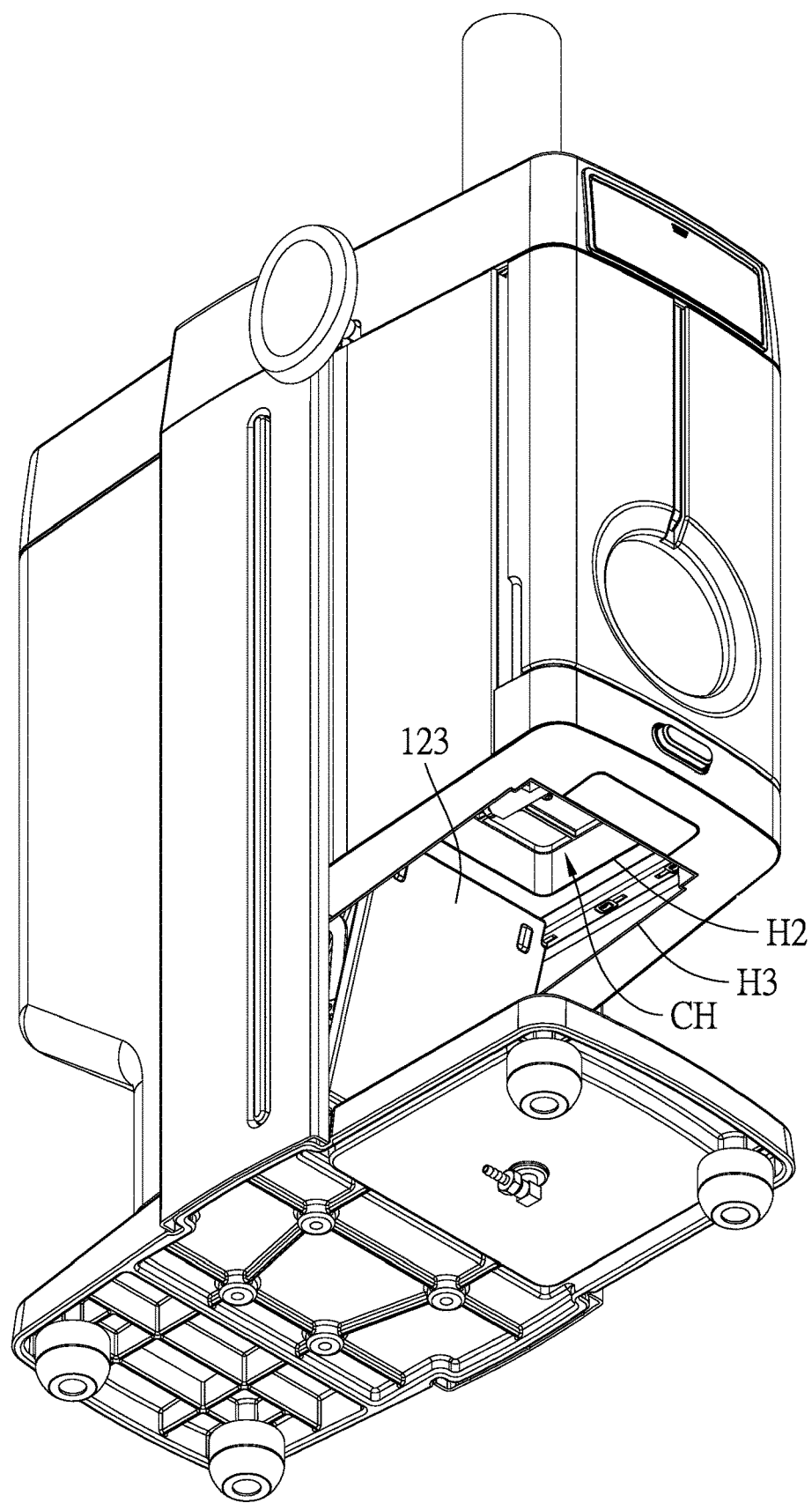
FIG. 10 is a schematic diagram of the appearance of a part of the ice shaver drawn according to an embodiment of the present invention, which is used to present the state when the second door assembly unseals the ice dropping channel to expose the knife assembly and the unclosed second opening of the ice dropping channel.

Specifically, the second door assembly 121 of the refrigerator 10 according to an embodiment of the present invention includes a first plate 122, a second plate 123, a spring 124, and a rotary shaft 125. The first plate 122 is pivotally connected to the second plate 123 through the rotary shaft 125. The spring 124 is sleeved onto the rotary shaft 125 and includes a first end 1241 and a second end 1242 opposite to the first end 1241. The first end 1241 of the spring 124 abuts against the first plate 122, and the second end 1242 of the spring 124 abuts against the second plate 123. The tension of the spring 124 can keep the first plate 122 and the second plate 123 non-parallel when the second door assembly 121 does not seal the ice dropping channel CH. When the second door assembly 121 is in the sealing position, as shown in FIGS. 2, 4, 5 and 9, the first plate 122 seals the second opening H2, the second plate 123 seals the third opening H3, and the tension of the spring 124 causes the first plate 122 to press against the second opening H2, thereby sealing the second opening H2. At this time, if the first door assembly 110 also seals the first opening H1, the ice cubes in the accommodating space of the refrigerator 10 can be isolated from the outside air, thereby preventing the ice cubes from being contaminated. When the second door assembly 121 is moved to the unsealing position, as shown in FIGS. 7 and 10, the first plate 122 unseals the second opening H2, and the second plate 123 also unseals the third opening H3, so that the ice dropping channel CH is opened. At this time, if the pushing member 50 presses the ice cube against the knife assembly 40 so that the knife assembly 40 shaves or cuts the ice cube to generate snowy or crushed ice, the crushed ice can fall through the ice dropping channel CH to leave the refrigerator 10, and then drop into a container located near the third opening H3 of the ice dropping channel CH.

In addition, during the process of moving the second door assembly 121 from the unsealing position to the sealing position or from the sealing position to the unsealing position, the second door assembly 121 can move along the plane where the second opening H2 of the ice dropping channel CH is located. More specifically, referring to FIGS. 6 and 8, the second door assembly 121 further includes a positioning structure 126. The positioning structure 126 may, for example, include a connecting member 1261 and a sliding block 1262, but the invention is not limited thereto. The connecting member 1261 is pivotally connected to the sliding block 1262. In addition, the bearer 120 further includes a sliding groove 127 near the second opening H2 of the ice dropping channel CH. The sliding block 1262 is slidably disposed in the sliding groove 127. The sliding groove 127 includes a first end 1271 and a second end 1272 opposite to the first end 1271. When the second door assembly 121 is in the sealing position, the sliding block 1262 is located at the first end 1271 of the sliding groove 127. When the second door assembly 121 is in the unsealing position, the sliding block 1262 is located at the second end 1272 of the sliding groove 127.

Although the above-mentioned embodiments are described with a driving device in the form of motor drive as an example, in other embodiments, the driving device can also be a manual control member, so the user can manually operate the manual control member to drive the moving mechanism to drive the second door assembly to move between the unsealing position and the sealing position.

Although the present invention is disclosed in the foregoing embodiments, these embodiments are not intended to limit the present invention. Without departing from the spirit and scope of the present invention, all changes, modifications, and combinations of implementation modes are all within the scope of the present invention. For the scope of protection defined by the present invention, please refer to the attached claims.

While we have shown and described various embodiments in accordance with the present invention, it is clear to those skilled in the art that further embodiments may be made without departing from the scope of the present invention.

What is claimed is:

1. An ice shaver comprising:
   a refrigerator including a first opening, a first door assembly, and a bearer, the first door assembly being used to selectively seal and unseal the first opening, and the bearer including an ice dropping channel and a second door assembly;
   a moving mechanism connected to the second door assembly;
   a driving device configured to drive the moving mechanism so that the moving mechanism drives the second door assembly to selectively move between an unsealing position and a sealing position;
   a knife assembly arranged in the refrigerator and located near the ice dropping channel; and
   a pushing member arranged in the refrigerator to push an ice cube against the knife assembly so that the knife assembly is able to cut the ice cube to produce crushed ice, and the knife assembly being located between the pushing member and the second door assembly wherein:
   the second door assembly includes a first plate, a second plate pivotally connected to the first plate, and a spring, the spring includes a first end and a second end opposite to the first end, the first end of the spring abuts against the first plate, and the second end of the spring abuts against the second plate;
   the pushing member includes a pushing plate and a driver connected to the pushing plate and configured to drive the pushing plate to move toward and push the ice cube; and
   when the second door assembly is in the unsealing position, the second door assembly unseals the ice dropping channel so that the crushed ice falls through the ice dropping channel, and when the second door assembly is in the sealing position, the second door assembly seals the ice dropping channel.

2. The ice shaver as claimed in claim 1, wherein the ice dropping channel includes a second opening and a third opening opposite to the second opening, the first plate seals the second opening and the second plate seals the third opening when the second door assembly is in the sealing position, and the first plate unseals the second opening and the second plate unseals the third opening when the second door assembly is in the unsealing position.

3. The ice shaver as claimed in claim 2, wherein the second door assembly further includes a rotary shaft, the first plate is pivotally connected to the second plate through the rotary shaft of the second door assembly, the spring is sleeved onto the rotary shaft of the second door assembly.

4. The ice shaver as claimed in claim 1, wherein the first plate and the second plate are unparallel when the second door assembly unseals the ice dropping channel.

5. The ice shaver as claimed in claim 1, wherein the moving mechanism includes a rotating shaft and at least one arm, the arm includes a first end and a second end opposite to the first end, the first end of the arm is connected to the rotating shaft of the moving mechanism, the second end of the arm is pivotally connected to the second door assembly, when the driving device drives the rotating shaft of the moving mechanism to rotate in a first direction, the second door assembly moves toward the unsealing position to unseal the ice dropping channel, and when the driving device drives the rotating shaft of the moving mechanism to rotate in a second direction opposite to the first direction, the second door assembly moves toward the sealing position to seal the ice dropping channel.

6. The ice shaver as claimed in claim 5, wherein the bearer further includes a sliding groove disposed in the ice dropping channel, the second door assembly further includes a positioning structure slidably disposed in the sliding groove, the sliding groove includes a first end and a second end opposite to the first end, when the second door assembly is in the sealing position, the positioning structure is located at the first end of the sliding groove, and when the second door assembly is in the unsealing position, the positioning structure is located at the second end of the sliding groove.

7. The ice shaver as claimed in claim 2, wherein the moving mechanism includes a rotating shaft and at least one arm, the arm includes a first end and a second end opposite to the first end, the first end of the arm is connected to the rotating shaft of the moving mechanism, the second end of the arm is pivotally connected to the second door assembly, when the driving device drives the rotating shaft of the moving mechanism to rotate in a first direction, the second door assembly moves toward the unsealing position to unseal the ice dropping channel, and when the driving device drives the rotating shaft of the moving mechanism to rotate in a second direction opposite to the first direction, the second door assembly moves toward the sealing position to seal the ice dropping channel.

8. The ice shaver as claimed in claim 7, wherein the bearer further includes a sliding groove disposed in the ice dropping channel, the second door assembly further includes a positioning structure slidably disposed in the sliding groove, the sliding groove includes a first end and a second end opposite to the first end, when the second door assembly is in the sealing position, the positioning structure is located at the first end of the sliding groove, and when the second door assembly is in the unsealing position, the positioning structure is located at the second end of the sliding groove.

9. The ice shaver as claimed in claim 4, wherein the moving mechanism includes a rotating shaft and at least one arm, the arm includes a first end and a second end opposite to the first end, the first end of the arm is connected to the rotating shaft of the moving mechanism, the second end of the arm is pivotally connected to the second door assembly, when the driving device drives the rotating shaft of the moving mechanism to rotate in a first direction, the second door assembly moves toward the unsealing position to unseal the ice dropping channel, and when the driving device drives the rotating shaft of the moving mechanism to rotate in a second direction opposite to the first direction, the second door assembly moves toward the sealing position to seal the ice dropping channel.

10. The ice shaver as claimed in claim 9, wherein the bearer further includes a sliding groove disposed in the ice dropping channel, the second door assembly further includes a positioning structure slidably disposed in the sliding groove, the sliding groove includes a first end and a second end opposite to the first end, when the second door assembly is in the sealing position, the positioning structure is located at the first end of the sliding groove, and when the second door assembly is in the unsealing position, the positioning structure is located at the second end of the sliding groove.

11. The ice shaver as claimed in claim 4, wherein the moving mechanism includes a rotating shaft and at least one arm, the arm includes a first end and a second end opposite to the first end, the first end of the arm is connected to the rotating shaft of the moving mechanism, the second end of the arm is pivotally connected to the second door assembly, when the driving device drives the rotating shaft of the moving mechanism to rotate in a first direction, the second door assembly moves toward the unsealing position to unseal the ice dropping channel, and when the driving device drives the rotating shaft of the moving mechanism to rotate in a second direction opposite to the first direction, the second door assembly moves toward the sealing position to seal the ice dropping channel.

12. The ice shaver as claimed in claim 11, wherein the bearer further includes a sliding groove disposed in the ice dropping channel, the second door assembly further includes a positioning structure slidably disposed in the sliding groove, the sliding groove includes a first end and a second end opposite to the first end, when the second door assembly is in the sealing position, the positioning structure is located at the first end of the sliding groove, and when the second door assembly is in the unsealing position, the positioning structure is located at the second end of the sliding groove.

13. The ice shaver as claimed in claim 1, wherein the bearer further includes a sliding groove disposed in the ice dropping channel, the second door assembly further includes a positioning structure slidably disposed in the sliding groove, the sliding groove includes a first end and a second end opposite to the first end, when the second door assembly is in the sealing position, the positioning structure is located at the first end of the sliding groove, and when the second door assembly is in the unsealing position, the positioning structure is located at the second end of the sliding groove.

14. The ice shaver as claimed in claim 1, wherein the driving device includes a motor.

15. The ice shaver as claimed in claim 1, wherein the driving device is a manual control member.

* * * * *